United States Patent
Whinnett et al.

(10) Patent No.: US 6,459,891 B1
(45) Date of Patent: Oct. 1, 2002

(54) WIRELESS DEVICE, CONTROL SYSTEM AND METHODS FOR PROTECTED SITES WITH OPERATION ACCORDING TO INTERFERENCE PARAMETERS

(75) Inventors: Nicholas Whinnett, Swindon (GB); Anthony P Van Den Heuvel, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/446,220
(22) PCT Filed: Jun. 17, 1997
(86) PCT No.: PCT/EP97/03191
§ 371 (c)(1),
(2), (4) Date: Dec. 16, 1999
(87) PCT Pub. No.: WO98/58514
PCT Pub. Date: Dec. 23, 1998

(51) Int. Cl.$^7$ ................................................ H04B 7/185
(52) U.S. Cl. ........................ 455/411; 455/26.1; 455/12.1; 455/522
(58) Field of Search ..................... 455/1, 12.1, 411, 455/422, 453, 430, 26.1, 522

(56) References Cited

U.S. PATENT DOCUMENTS

| | | | | |
|---|---|---|---|---|
| 4,639,726 A | * | 1/1987 | Ichikawa et al. | 379/60 |
| 5,235,633 A | * | 8/1993 | Dennison et al. | 379/60 |
| 5,257,283 A | * | 10/1993 | Gilhousen et al. | 375/1 |
| 5,535,431 A | * | 7/1996 | Grube et al. | 455/54.1 |
| 5,548,800 A | * | 8/1996 | Olds | 455/12.1 |
| 5,640,414 A | * | 6/1997 | Blakeney et al. | 375/200 |
| 5,722,073 A | * | 2/1998 | Wallstedt et al. | 455/437 |
| 5,774,787 A | * | 6/1998 | Leopold et al. | 455/12.1 |
| 5,850,604 A | * | 12/1998 | Dufour et al. | 455/435 |
| 5,884,145 A | * | 3/1999 | Haartsen | 455/63 |
| 5,940,764 A | * | 8/1999 | Mikami | 455/456 |
| 5,970,414 A | * | 10/1999 | Bi et al. | 455/456 |
| 6,011,973 A | * | 1/2000 | Valentine et al. | 455/456 |

* cited by examiner

*Primary Examiner*—Daniel Hunter
*Assistant Examiner*—Stephen D'Agosta

(57) ABSTRACT

A wireless device (104) selectively opreates near protected sites (110) including equipment at least intermittently using an operating frequency. The wireless device upon detecting a beacon signal from a beacon system (112) ascertains interference parameters. The interference parameters are used to control operation of the wireless device to prevent harmful interference with the equipment at the protected site. The operation is selectively altered depending upon the interference parameters ascertained. The wireless device can be intelligently controlled from a control system (105).

14 Claims, 5 Drawing Sheets

WIRELESS DEVICE, CONTROL SYSTEM AND METHODS FOR PROTECTED SITES WITH OPERATION ACCORDING TO INTERFERENCE PARAMETERS

FIELD OF THE INVENTION

The present invention relates to preventing interference between wireless devices and protected sites.

BACKGROUND OF THE INVENTION

The advent of satellite communication systems has resulted in potential conflicts between emissions from the satellite telephones and other systems. A radio astronomy site (RAS) is one example of a site requiring protection. Equipment at radio astronomy sites take measurements of radio waves over an interval of time, known as the integration interval. During the integration intervals, signals emitted by nearby satellite telephones may be detected by the RAS equipment. This can result in errors in the measurements made at these sites. Other sensitive sites that satellite telephone transmissions might interfere with include airports where sensitive satellite navigation equipment may be used.

An approach has been developed to avoid such interference between satellite telephones and other systems. This approach includes transmission of a beacon signal from the site requiring protection. For example, the beacon signal is transmitted from the RAS during the integration interval of the RAS equipment. When a satellite telephone detects the beacon signal, it shuts down. This prevents emissions from the satellite telephone interfering with the protected site. The beacon signal is designed such that its transmit power, antenna pattern, shielding and frequency of operation produce beacon emissions that do not have a detrimental impact on the measurements.

Although this system prevents interference, it is desirable to provide a more intelligent beacon system.

SUMMARY OF THE INVENTION

A wireless device selectively operates near a protected site. The wireless device responds to a detected beacon signal. Interference parameters are used to control operation of the wireless device to avoid interference with equipment at the protected site. The operation is selectively altered depending upon the inference parameters ascertained whereby the wireless device does not necessarily have to be disabled.

A method of operating a control system to intelligently control a wireless device near a beacon system is also disclosed.

A wireless device selectively operating near a protected site is also set forth. A control system for wireless devices operating near a protected site is disclosed.

DESCRIPTION OF THE PREFERRED EMBODIMENTS

Figure 1:
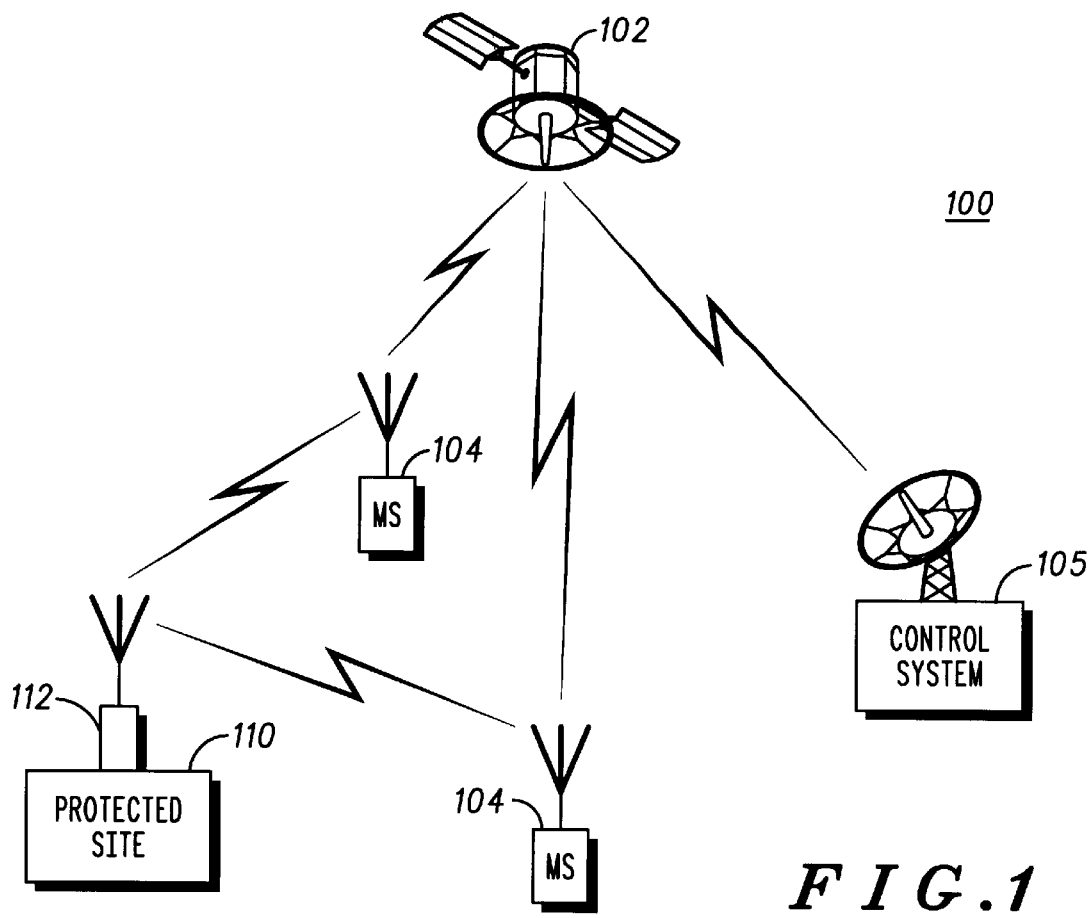
FIG. 1 illustrates a satellite communication system and a beacon system.

A satellite communication system 100 (FIG. 1) includes a satellite 102, satellite terminals 104 communicating with satellite 102, and a satellite control system 105 communicating with satellite 102. The satellite control system 105 communicates with a plurality of satellites as well as other satellite control systems. Although a single satellite 102 is shown, it will be recognised that a number of satellites 102 are provided in a satellite system.

Thus, the satellite 102 represents a network of satellites that communicate with the satellite terminals 104 and satellite control system 105.

A protected site 110 includes a beacon system 112. Equipment at the protected site uses an operating frequency that is subject to interference from satellite terminals 104. The protected site can be an airport, a radio astronomy site, or any other location having equipment desiring protection against emissions from satellite terminals 104. For brevity, the following description is based upon radio astronomy sites, but it will be recognised that it apples to any site requiring protection.

Figure 2:
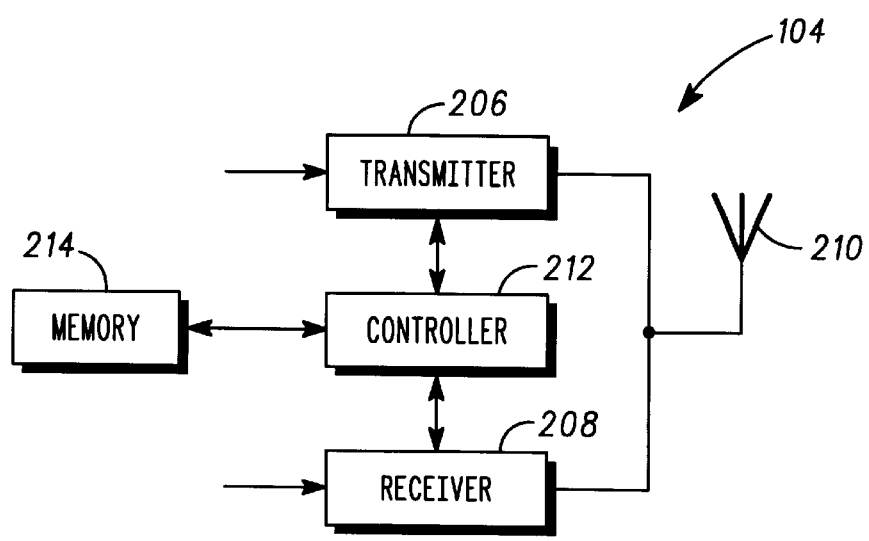
FIG. 2 is a circuit diagram in block diagram form illustrating a satellite terminal.

The satellite terminals 104 include a transceiver, having a transmitter 206 (FIG. 2) and a receiver 208, connected to an antenna 210. The transmitter 206 and receiver 208 communicate via antenna 210 under the control of a controller 212. A memory 214 is connected to controller 212. The controller 212 can be implemented using a digital signal processor (DSP), a microprocessor, a programmable logic unit (PLU), or the like. The transmitter 206 and the receiver 208 are implemented using any suitable transmitter and receiver circuitry for satellite communications. The memory 214 can be implemented by a random access memory (RAM), a read only memory (ROM), an electronically erasable programmable read only memory (EEPROM), or the like. The satellite terminals 104 can be a portable satellite telephone, a vehicle satellite telephone, a home or business satellite communication system, a mobile satellite multimedia terminal, a mobile satellite data terminal, or the like.

In addition to mobile satellite telephones, if land radio communications services interfere with sensitive sites, the beacon system can be employed. For protection from land mobile communicated services, communications between the mobile telephones and the control system take place via terrestrial base stations rather than satellites. For brevity, this description is based upon a satellite system, but it will be recognised that is applies to any mobile radio system. Accordingly, "wireless device" as used herein refers to satellite telephones, cellular radiotelephones, cordless radiotelephones, two-way radios, and any other wireless device emitting signals that may interfere with equipment at protected site, and the description of satellite terminals applies to each of these wireless devices and their equivalents.

The satellite 102 is of the type that orbits around the earth and acts as a repeater for signals communicated between the satellite control system 105 and the satellite terminals 104. Such satellites are well known, and will not be described in greater detail herein for brevity.

Figure 3:
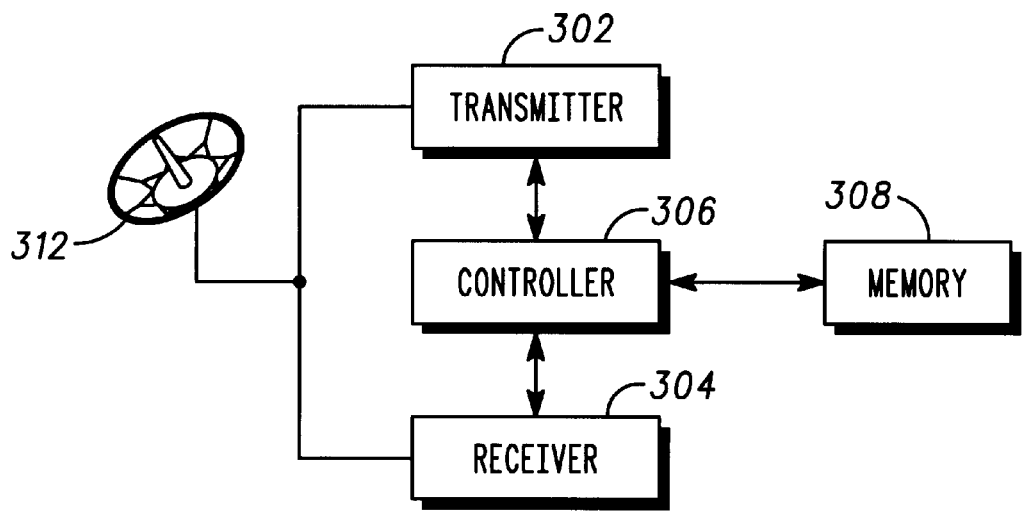
FIG. 3 is a circuit diagram in block diagram form illustrating a portion of a satellite control system.

The satellite control system 105 includes a transceiver, having a transmitter 302 (FIG. 3) and a receiver 304, connected to a controller 306. The transmitter 302 and the receiver 304 are implemented using any suitable circuitry for satellite communications, and are connected to an antenna, such as a satellite dish 312. The controller 306 controls transmission of signals to the satellite 102. The controller 306 can be implemented using a DSP, a PLU, a microprocessor, or a computer. A memory 308 is connected to the controller 306. The memory 308 can be implemented using a RAM, a ROM, an EEPROM, or the like. The memory 308 stores operating programs for the controller 306, satellite terminal status information, and beacon information. It will be recognized that the control system can be a satellite control system, land mobile controller such as a cellular base station, a dispatch center, or any other wireless device controller, and "control system" as used herein refers to each of these and their equivalents.

Figure 4:
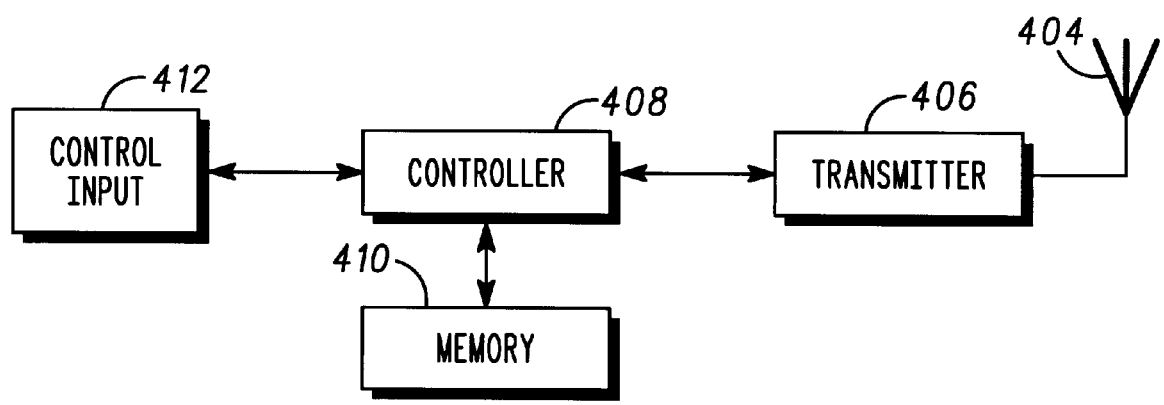
FIG. 4 is a circuit diagram in block diagram form illustrating a beacon circuit.

The beacon system 112 includes an antenna 404 (FIG. 4) positioned in close proximity to the protected site 110. Beacon signals are input to the antenna 404 from a transmitter 406. The transmitter 406 generates a signal having a predetermined frequency, and may for example have a frequency of 1.6264 Ghz. A controller 408 is connected to memory 410 and a control input 412. Memory 410 stores the operating program for controller 408. The control input 412 is used to activate the beacon system. The control input is implemented using a manually actuated switch, a personal computer, or any other suitable source of control signals. Activation of the beacon can thus be manual or automatic, such that the beacon signal is only generated when protection is required, and is thus generated at least intermittently. The controller 408 is implemented using a microprocessor, a DSP, a PLU, a computer, or the like. The controller 408 is responsive to the activation signal from the control input 412 to the control transmitter 406 to transmit the beacon signal via antenna 404.

The satellite terminal 104 is responsive to a beacon signal from the beacon system 112 to selectively interrupt the operation of the satellite terminal 104. In the absence of a beacon signal sufficiently strong for the satellite terminal to detect, the satellite terminal 104 operates freely according to ordinary processes.

Figure 5:
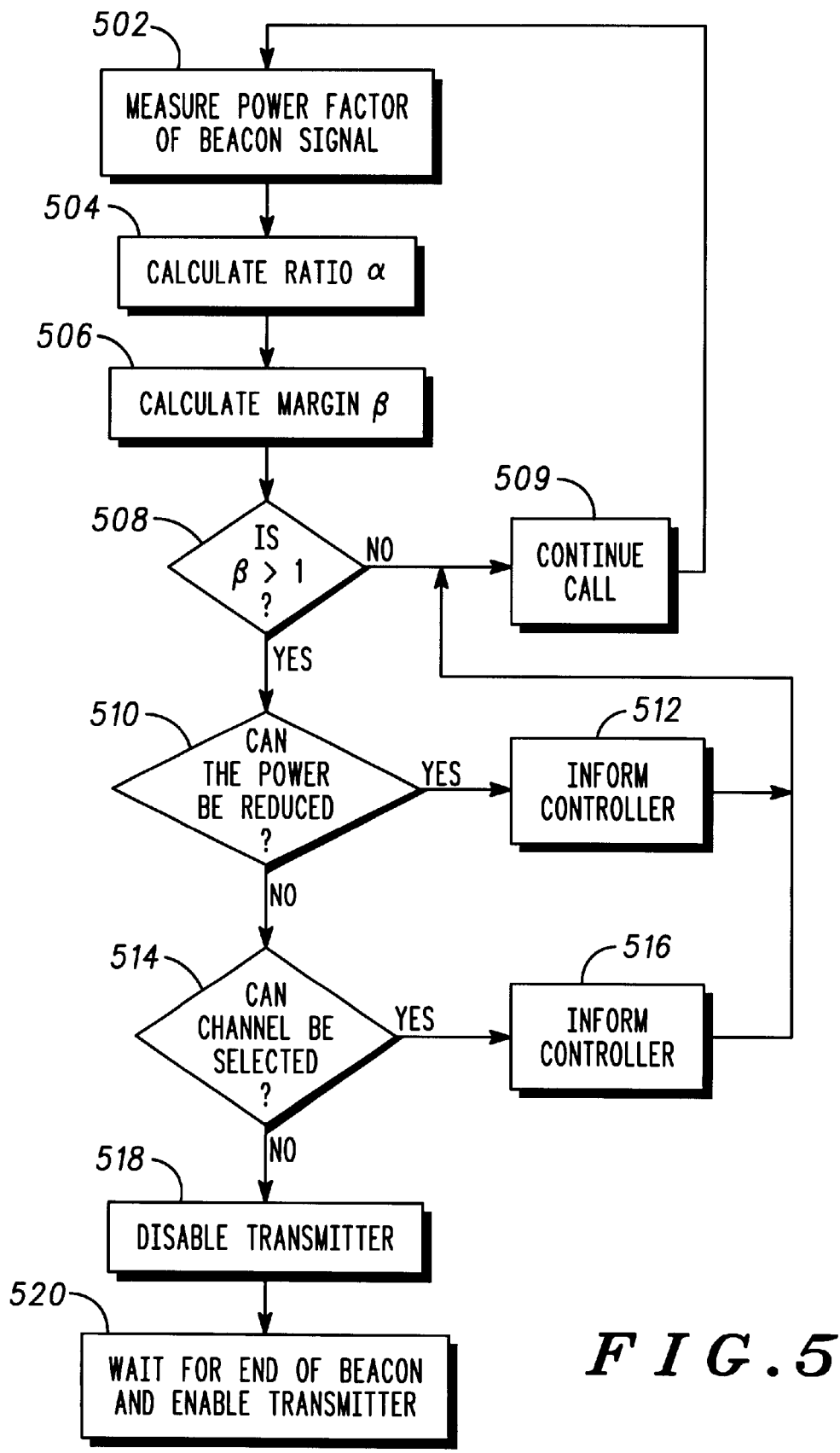
FIG. 5 is a flow chart illustrating operation of a terminal.

Upon detection of a beacon signal, the satellite terminal controller 212 makes several measurements. The signal factor G is measured in block 502 (FIG. 5), as follows:

$$G=(\text{signal power})/\text{sensitivity}.$$

The signal power is the measurement of the received beacon signal level. The sensitivity is the minimum signal level that the satellite terminal 104 is able to detect. The sensitivity is predetermined, being established when the satellite terminal is manufactured. It will be recognized that the sensitivity level can be a predetermined signal level for all satellite terminals of a particular model, based upon a typical sensitivity of the receiver of the satellite terminal model. Alternatively, the sensitivity can be individually set for each satellite terminal based upon actual measurements taken at the factory.

The satellite terminal controller 112 also calculates a ratio α in block 504:

$$\alpha=(\text{worst case interference})/(\text{estimated actual interference}).$$

The ratio α depends on the frequency separation between the satellite terminal 104 and the frequency used at the protected site 110. The worst case interference is the maximum interference that is possible from the satellite terminal 104. The worst case interference occurs when the satellite terminal transmit channel and the frequency spectrum of interest to the equipment at the protected site 110 are the closest that they can be in their respective allocated spectrums, the power level of the transmit signal is at its highest possible level, and the transmitter is emitting channel signals at the spectrum mask of the satellite terminal transmit channel. The spectrum proximity between the frequency of operation of the protected site 110 and the operating frequency of the satellite terminal 104 is $\Delta f$. Thus for example, the frequency protected in a RAS system is 1.6106 to 1.6138 GHz, and a satellite telephone has transmit channels in the range of 1.6215 GHz–1.6263 GHz.

Figure 6:
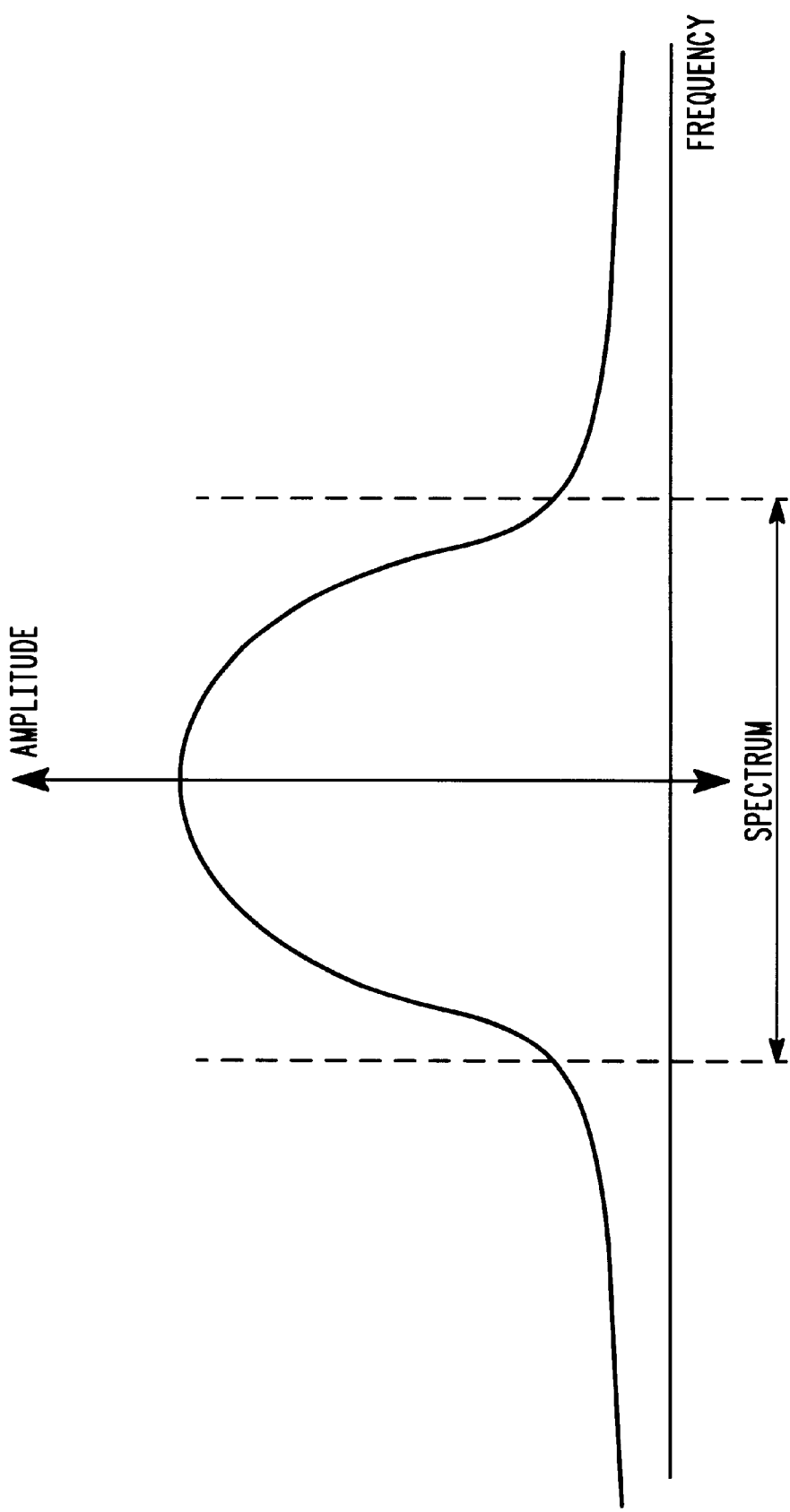
FIG. 6 is signal diagram illustrating a spectrum mask, showing amplitude as a function of frequency.

The satellite terminal 204 transmit channels have a spectrum mask shown in FIG. 6. The mask is the maximum energy that the signals emitted by the transmitter 106 can have as a function of frequency. As can be seen from FIG. 6, the mask amplitude is lower for frequencies farther from the allocated spectrum. Accordingly, the proximity $\Delta f$ and the spectrum mask at the maximum power output of the satellite terminal 104 determines the worst case interference. The actual interference is the amount of interference that is expected given the actual spectrum proximity, the spectrum mask, and the actual transmission power of the satellite terminal 104. It will be recognised that the power level of the satellite terminal will change as the path between the satellite 102 and the satellite terminal 104 changes.

The controller 212 periodically calculates an interference margin 13 in block 506, where:

$$\beta=\mu^*G^*(Pt/Pm)/\alpha.$$

The beacon power is calculated to protect against a single continuous maximum power, Pm, transmission assuming the worse case unwanted emissions. At a particular instant, the required uplink transmission power of a particular satellite terminal 104 is Pt. The duty cycle $\mu$ is the expected proportion of time a terminal is transmitting, which will depend on voice activity, video transmissions or data activity (that is the proportion of time a user is speaking or has data to send), and the access scheme such as time division multiple access (TDMA), code division multiple access (CDMA), or frequency division multiple access (FDMA).

The satellite terminal controller 212 determines if the interference margin $\beta$ is met (i.e., $\beta<1$), such that the transmission interference with the protected site equipment is below a level, in decision block 508. If it is met, the call is continued, as indicated in block 509. If the interference margin $\beta$ is not met (i.e., $\beta>1$), then the call is suspended. The controller then determines if the transmit power, or the transmit bit rate, can be reduced such that Pt is reduced and the interference margin $\beta<1$ is met, in decision block 510. If it is, then the satellite terminal controller 212 will control the transmitter 206 to transmit a signal to the satellite control system 105 requesting this change in block 512, and the call will continue. If not, then the controller will determined if a different channel can be selected such that α can be reduced and the interference margin $\beta<1$ is met, in decision block 512. If a channel can be selected such that the interference margin can be met, as determined in decision block 514, then the satellite terminal controller 212 will control the transmitter 206 to transmit a signal to the satellite control system 105 requesting the change, in block 516, and the call will continue. If a suitable channel can not be selected, then the transmitter 206 is disabled in block 518. By disabling only the transmitter 206, the satellite terminal can still receive signals.

The satellite terminal controller 212 reactivates the transmitter at the end of the beacon transmission period. The end is determined when the beacon is no longer detected. Alternatively, the end is detected using time remaining information contained in the beacon signal. The time remaining information can be used by a timer. For example, the controller 212 can act as a timer to count down the time remaining, at the end of which the transmitter 206 is enabled.

Thus, if the interference margin β is less than or equal to one, it will be met, and the call will continue. If the interference margin is not met, such that 13 is greater than one, some action is taken by the controller 212. The actions that can be taken can include changing to a different channel, such that the spectrum of the satellite terminal 104 is further from the spectrum of the potentially interfered with protected equipment. Alternatives include lowering the power level of the satellite terminal 104. If the power can not be lowered, the satellite terminal controller 212 can wait for the transmission path to improve such that communication at a lower power level is possible. The controller 212 will inform the user that they will have to wait until the satellite terminal can successfully communicate with the satellite 102 at a lower power level, such as when the satellite 102 is positioned above the satellite terminal 104. The power level required to transmit signals to the satellite 102 changes as the signal path from the satellite terminal 104 to the satellite 102 changes.

Either the transmitter 206 alone, or the transmitter 206 and the receiver 208 together, can be turned off. The power measurement is preferably repeated periodically. For example, every 1 second while the beacon is detected, a measurement is made. This allows the satellite terminal 104 to accommodate power changes of the transmitter 206 emissions, as well as location changes relative to the protected site 110.

Another possible action is to limit the length of satellite terminal transmitter 206 usage while it is within the range of beacon system 112. This allows the satellite terminal 104 transmitter to be used for brief periods of time, so long as it does not interfere with the protected site 110. More particularly, in the case of RAS integration times for example, the RAS will make a measurement over an integration interval. The integration interval will vary, and may for example be a 30 minute time period. During the 30 minute integration interval, a short transmission by the satellite terminal 104 will not substantially harm the measurement by the RAS equipment. In the case of a 3 minute transmission by transmitter 206, the margin β can be relaxed to 10% of its former value, since only 1/10 of the energy would be put into the RAS band during the integration period. Thus, the satellite control system can allow the satellite terminal to make a short 3 minute call during a 30 minute integration period. However, if the RAS Integration time is short, such as 3 minutes long, the margin β can be reduced by a certain amount, such as $1/\sqrt{10}$ for 5 dB, as sensitivity is assumed to be proportional to the square root of the observation internal for a RAS device. Therefore, the margin β for the satellite terminal can be lowered 5 dB for a 3 minute integration time relative to the corresponding threshold for a 30 minute integration time. Thus, the margin β can be adjusted depending on duration of the satellite terminal transmission and the RAS integration time. By reducing β, the threshold margin β<1 is more easily met.

Figure 7:
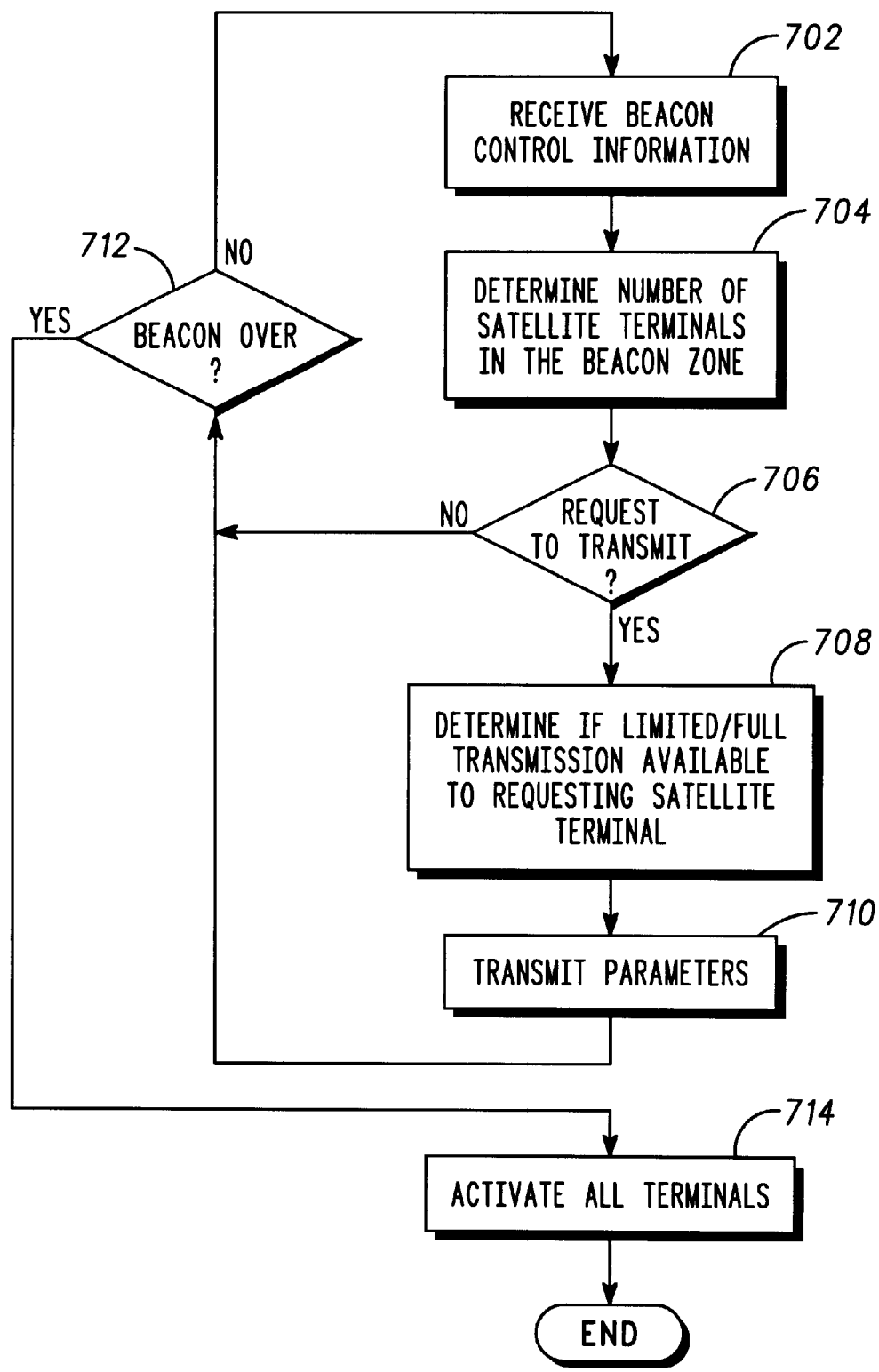
FIG. 7 is a flow chart illustrating operation of a satellite control system.

The beacon system 112 provides integration time and time remaining information in the beacon signal. The beacon signal can also provide information identifying the location of the protected site 110. The satellite terminal 104 uses this information in determining when the beacon system 112 will be done transmitting (i.e. when the protected site will no longer require protection) and for adjusting the margin level β according to the transmission time, as described above. Operation of the satellite control system 105 for an intelligent beacon management system will now be described with reference to FIG. 7. The satellite control system receives control information originated in the beacon system 112 and communicated through the satellite terminal 104 and the satellite 102, in block 702. This information includes broadcast information on the protection requirements of the protected site, the total time duration of the protection period, and the remaining time duration for the protection period. The satellite terminals 104 measure the beacon power and input the beacon information transmitted therewith. This information is passed from the satellite terminal 104 to the satellite 102 and on to the satellite control system 105. This burst is preferably short to avoid interfering substantially with the beacon measurement.

The controller 306 of the satellite control system 105 is responsive to information received from the satellite terminals 104 to control signal transmissions by satellite terminals 104 within the zone of the beacon system 112. The beacon zone is the transmission range of the beacon system 112. The satellite control system 105 determines the number of satellite terminals 104 within the beacon zone by counting the number of terminals detecting the beacon, in block 704. The satellite control system 105 also monitors the estimated interference to the protected site form each user active in a call, in block 704. The controller 306 determines whether capacity is available when one or more of the terminals has requested permission to transmit, in decision block 706. If one of the satellite terminals 104 has requested permission to transmit, the controller 306 determines whether limited or full transmission capacity is available, in block 708. This will depend upon the relative distance between the requesting satellite terminal 104 and the protected site 110, the predicted power of transmissions from the satellite terminal 104, the spectrum masks for the requesting satellite terminal 104, the estimated interference from other active terminals and an activity factor (integration time and time remaining) for the protected site 110. The distance can be determined from the signal strength of the beacon signal detected by the requesting satellite terminal 104. Alternatively, it can be measured from the position of the satellite terminal 104, measured by Doppler measurements from the satellite 102 or a global positioning information, and the position of the protected site 110, as included in the beacon signal.

Responsive to this information, the control system 105 transmits control parameters, which may be constraints on transmissions for example, to the requesting satellite terminal 104, in block 710. These parameters include maximum length of call indications, channels that can be used by the satellite terminal 104, a maximum power and the bit rates permissible for the call. The control system 105 can deny access until one or more of the other terminals 104 ceases being active. In some cases the satellite control system 105 can determine that the activity level is so high that it transmits a signal telling all of the satellite terminals 104 within the beacon zone to turn off.

Following the transmission of the parameters, or a determination that no request for transmission has occurred, as detected in block 706, the controller 306 determines whether the protected site 110 no longer requires protection, in decision block 712. This can be detected by the lack of a beacon signal or the lapse of the protected time interval indicated by the beacon signal, if included. If protection is no longer needed, the controller 306 returns to block 706. If the protection interval is over, the controller 306 controls transmitter 302 to broadcast a signal informing the satellite terminals 104 that they can operate freely. In this way, the satellite terminals 104 are intelligently monitored and controlled to avoid interference with the protected site.

Thus, the satellite terminals 104 operate in a manner to reduce the emissions that would potentially interfere with equipment at a protected site. This is done by operating only at low power levels and/or by changing to a signal which has further separation from the operating frequency of the protected site 110, and if necessary, by disabling transmission by the satellite terminals 104. The satellite terminals 104 can operate in the presence of the beacon signal in such situations that the satellite terminal 104 will not cause substantial interference with the system of the protected device.

What is claimed is:

1. A method of operating a control system to control operation of a wireless device in a beacon zone of a protected site, comprising the steps of:

receiving beacon signal information and device status information from at least one wireless device in the beacon zone; and calculating control parameters for the at least one wireless device in the beacon zone from the beacon signal information and the device status information, the calculated control parameters being such that an estimated total interference from wireless devices in the beacon zone is less than a threshold.

2. The method as claimed in claim 1, further including the step of determining the threshold from beacon signal information.

3. The method as claimed in claim 1, wherein the calculated control parameters are generated from predicted power of wireless device transmissions, spectrum masks for wireless device transmissions, and activity factors, the activity factors including expected activity of speech, video or data applications, a duty cycle of transmissions, and activity of protected site frequency usage.

4. The method as claimed in claim 1, wherein the control system transmits inhibition or constraint indications to the wireless device.

5. The method as claimed in claim 1, wherein the control system transmits enabling instructions to the wireless device if capacity becomes available to the wireless device.

6. A control system, comprising:

a transceiver to transmit and receive signals communicated with a wireless device;

a controller coupled to the transceiver, the controller receiving information from the wireless device regarding a beacon signal that the wireless device detects and transmitting operating parameters for the wireless device; and wherein the controller calculates the operating parameters from predicted transmission powers and spectrum masks for transmission by the wireless device in a beacon zone and activity factors for the wireless device.

7. The control system as claimed in claim 6, wherein the control system transmits transmission constraint indications to the wireless device.

8. A communications system for selectively operating a wireless device near a protected site, the system comprising:

the wireless device, wherein the wireless device comprises:

means for receiving a beacon signal transmitted from a beacon located proximate to the protected site;

means for notifying a control station of reception of the beacon signal;

the control station, wherein the control station comprises:

means for monitoring an interference level of signal transmissions from wireless devices proximate to the protected site; and means for instructing the wireless device to modify a continuing operation of the wireless device based upon the monitored interference level.

9. The communications system according to claim 8, wherein the control station is located in a satellite.

10. The communications system according to claim 8, wherein the means for monitoring comprises means for counting a number of wireless devices detecting the beacon signal.

11. A method of selectively operating a wireless device near a protected site comprising steps of:

receiving, by the wireless device, a beacon signal transmitted from a beacon located proximate to the protected site;

notifying, by the wireless device, a control station of reception of the beacon signal;

monitoring, by the control station, an interference level of signal transmissions from other wireless devices proximate to the protected site; and instructing, by the control station, the wireless device to modify a continuing operation of the wireless device based on the interference level.

12. The method according to claim 11, wherein the step of instructing comprises a step of notifying the wireless device of at least one of a maximum power level that the wireless device is permitted to transmit, a bit rate, and a duration of a call.

13. The method according to claim 11, wherein the step of instructing comprises a step of notifying the wireless device to switch off.

14. The method according to claim 11, wherein the step of instructing comprises a step of notifying the wireless device to operate in an unrestricted manner.

* * * * *